United States Patent [19]
Courville et al.

[11] Patent Number: 5,579,381
[45] Date of Patent: Nov. 26, 1996

[54] METHODS AND APPARATUS FOR PROVIDING SUPPRESSED RINGING ACCESS

[75] Inventors: Bernard Courville, Pierrefonds; Sandro Cianci, Montreal; Jeffrey J. Brown, Edmonton; Norman Zolyniak, Pointe Claire, all of Canada

[73] Assignee: Northern Telecom Limited, Montreal, Canada

[21] Appl. No.: 295,584

[22] Filed: Aug. 25, 1994

[51] Int. Cl.$^6$ ................................. H04M 3/42
[52] U.S. Cl. .................. 379/201; 379/96; 379/107; 379/243; 379/252; 370/110.1
[58] Field of Search ........................ 379/201, 106, 379/107, 92, 96, 98, 207, 243, 245, 252, 94, 93; 370/110.1

[56] References Cited

U.S. PATENT DOCUMENTS

| 5,189,694 | 2/1993 | Garland | 379/106 |
|---|---|---|---|
| 5,243,644 | 9/1993 | Garland et al. | 379/106 |
| 5,359,641 | 10/1994 | Schull et al. | 379/106 |
| 5,377,186 | 12/1994 | Wegner et al. | 379/207 |
| 5,394,461 | 2/1995 | Garland | 379/106 |

*Primary Examiner*—Ahmad F. Matar
*Attorney, Agent, or Firm*—C. W. Junkin

[57] ABSTRACT

In methods and apparatus for providing suppressed ringing access to a subscriber line, a connection request is sent from a server to a telecommunications switch and the switch performs a connection routine in response to the connection request to connect the server to the subscriber line. The connection routine is adapted to avoid audible ringing of a telephone set connected to the subscriber line. The connection request comprises a signal indicating a subscriber line to which the server is to be connected and a signal indicating that suppressed ringing access to that subscriber line is desired. The methods and apparatus avoid the need for especially provisioned trunks between the server and the terminating switches by including in the connection request a signal indicating that suppressed ringing is desired and by making the telecommunications switch responsive to that signal.

17 Claims, 4 Drawing Sheets

METHODS AND APPARATUS FOR PROVIDING SUPPRESSED RINGING ACCESS

FIELD OF INVENTION

This invention relates to methods and apparatus for providing suppressed ringing access to subscriber lines for telemetry and other applications.

BACKGROUND OF INVENTION

U.S. Pat. Nos. 5,189,694 and 5,243,644 issued Feb. 23, 1993 and Sep. 7, 1993 respectively in the names of Stuart M. Garland et al, and are entitled "Telemetry Access Arrangement". These patents describe methods and apparatus for establishing suppressed ringing access to subscriber lines so that utility meters connected to the subscriber lines can be read without ringing telephone sets connected to the same subscriber lines.

According to the methods and apparatus described in U.S. Pat. Nos. 5,189,694 and 5,243,644, a telephone operating company provisions Utility Telemetry Trunks (UTT) between a telemetry server located at a central office of the telephone operating company and all terminating switches which serve subscriber lines to which utility meters are connected. Each terminating switch is programmed to provide normal ringing access to connections made via trunks other than the UTT and to provide suppressed ringing access for connections made via the UTT. For suppressed ringing service via subscriber carrier facilities, the terminating switch is programmed to provide a short burst of ringing— long enough to enable the subscriber line carrier to set up the connection, but too short to cause audible ringing of telephone sets connected to the subscriber line.

Unfortunately, the cost of provisioning UTT can be high enough to constrain the number of terminating switches and subscriber lines that can be accessed by the telemetry server.

SUMMARY OF INVENTION

An object of this invention is to provide suppressed ringing access without requiring the provisioning of trunks for that purpose.

One aspect of this invention provides a method for providing suppressed ringing access to a subscriber line. The method comprises sending a connection request from a server to a telecommunications switch and performing a connection routine at the telecommunications switch in response to the connection request to connect the server to the subscriber line, the connection routine being adapted to avoid audible ringing of a telephone set connected to the subscriber line. The connection request comprises a signal indicating a subscriber line to which the server is to be connected and a signal indicating that suppressed ringing access to that subscriber line is desired.

The need for especially provisioned trunks between the server and the terminating switches is avoided by including in the connection request a signal indicating that suppressed ringing is desired and by making the telecommunications switch responsive to that signal.

The connection between the server and the subscriber line may be made via at least one other telecommunications switch and trunking facilities linking the telecommunications switches. In that case, the method further comprises performing a connection routine at each other telecommunications switch in response to the connection request to connect the server to the subscriber line.

For example, one of the telecommunications switches may be an originating switch connected to the server via an access facility which supports an ISDN access protocol (e.g. Primary Rate Access (PRA) protocol or Basic Rate Access (BRA) protocol). The originating switch supports interworking between the ISDN access protocol and Integrated Services User Part (ISUP) protocol. Another of the telecommunications switches may be a terminating switch connected to the subscriber line, the terminating switch supporting ISUP connectivity. The originating switch may be connected to the terminating switch via Public Switched Telephone Network (PSTN) facilities supporting ISUP protocol.

In this case, the connection request may comprise a Setup Message (SM) sent from the server to the originating switch and an Initial Address Message (IAM) sent from the originating switch to the terminating switch. The SM may comprise a routing number and a subscriber line number. The originating switch may add a server identification number to generate the IAM from the SM, and may route the IAM to the terminating switch based on the routing number. The terminating switch may be responsive to the subscriber line number to connect the server to the subscriber line and responsive to the routing number to suppress ringing on the subscriber line. The terminating switch may be programmed to complete the connection to the subscriber line only if certain screening criteria are met.

Where the terminating switch is connected directly to the desired subscriber line, the terminating switch may apply no ringing signal to the subscriber line to suppress ringing. Where the terminating switch is connected to the desired subscriber line via subscriber line carrier facilities which require an Open Switch Interval (OSI) signal to establish a connection, the terminating switch may apply the OSI signal. Alternatively, where the terminating switch is connected to the desired subscriber line via subscriber line carrier facilities requiring a ringing signal to establish a connection, the terminating switch could be programmed to apply a ringing signal having a duration sufficient to cause the subscriber line carrier equipment to complete a connection but insufficient to cause audible ringing of a telephone set connected to the subscriber line.

The suppressed ringing access method may be used for telemetry applications, or may be used for downloading information from servers to telecommunications terminals connected to subscriber lines. The downloaded information may include information to be displayed at the telecommunications terminals, and may include information required to enable services to be provided via the telecommunications terminals.

Another aspect of this invention provides apparatus for providing suppressed ringing access to subscriber lines. The apparatus comprises a server adapted to generate a connection request comprising a signal indicating a subscriber line to which the server is to be connected and a signal indicating that suppressed ringing access to that subscriber line is desired. The apparatus further comprises a telecommunications switch responsive to the connection request to connect the server to the subscriber line while suppressing the application of ringing to the subscriber line so as to avoid audible ringing of a telephone set connected to the subscriber line.

The telecommunications switch may be a terminating switch on which the desired subscriber line is provisioned.

In this case, the apparatus may further comprise an originating switch which supports interworking between an ISDN access protocol (e.g. PRA or BRA protocol) and Integrated Services User Part (ISUP) protocol, an access line which supports the ISDN access protocol connecting the server to the originating switch, and trunking and signalling facilities connecting the originating switch to the terminating switch. The trunking and signalling facilities should support ISUP protocol.

BRIEF DESCRIPTION OF DRAWINGS

Embodiments of the invention are described below by way of example only. Reference is made to accompanying drawings in which.

DETAILED DESCRIPTION

Figure 1:
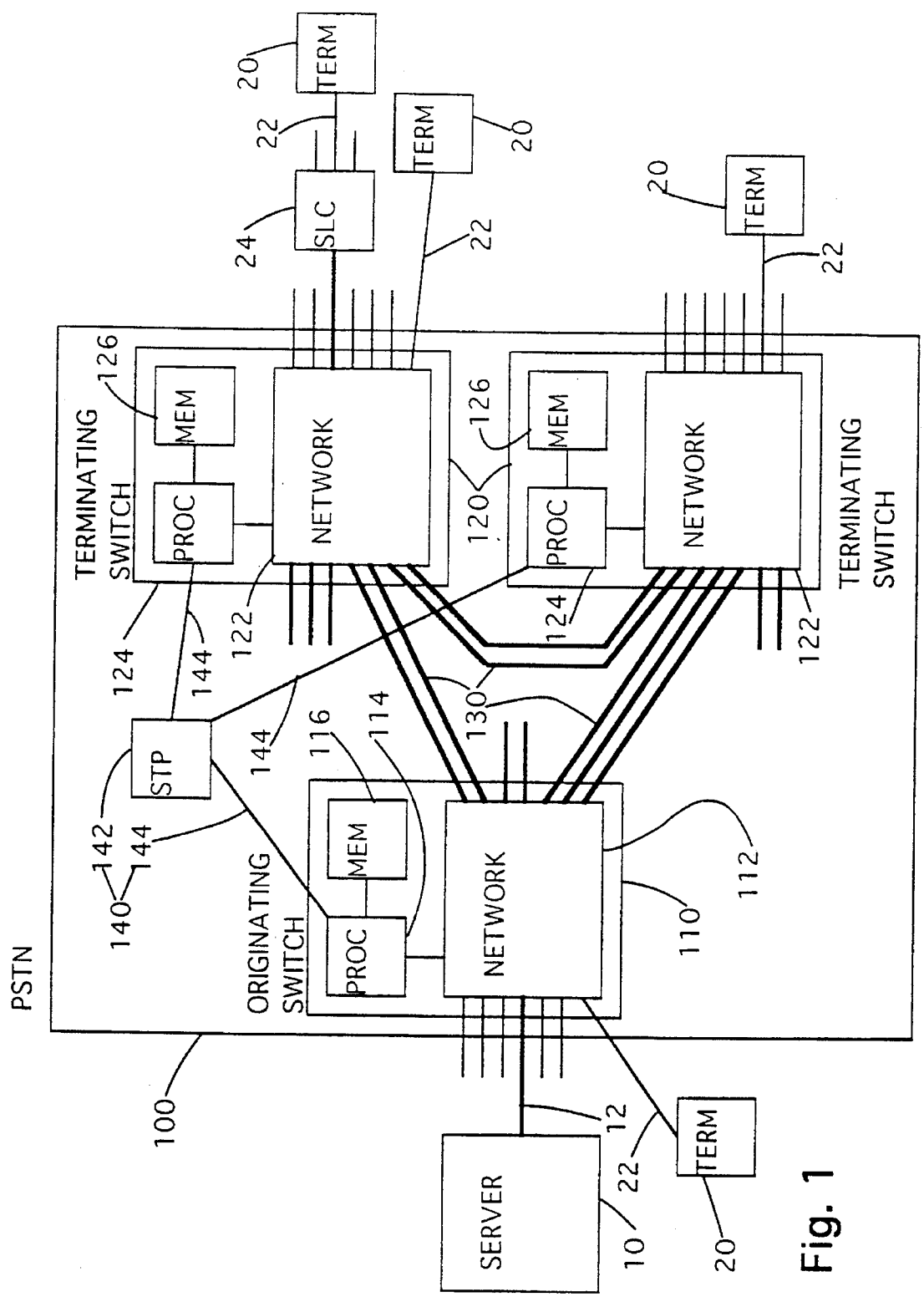
FIG. 1 is a block schematic view of a telecommunications network configured to provide suppressed ringing access according to an embodiment of the invention.

FIG. 1 is a block schematic diagram of a telecommunications network configured to provide suppressed ringing access to subscriber lines. The telecommunications network comprises a public switched telephone network (PSTN) 100, a server 10 connected to the PSTN 100 via a Primary Rate Access (PRA) line 12 and a plurality of telecommunications terminals 20 connected to the PSTN 100 via subscriber lines 22 and, in some instances, Subscriber Line Carrier (SLC) facilities 24. The PSTN 100 comprises an originating switch 110, a plurality of terminating switches 120 and a plurality of trunks 130 which interconnect the switches 110, 120. The PSTN 100 further comprises a Common Channel Signalling (CCS) network 140 interconnecting the switches 110, 120. The CCS network 140 comprises at least one Signalling Transfer Point (STP) 142 and signalling transmission facilities 144 connecting the STP 142 to each of the switches 110, 120.

Each switch 110, 120 comprises a switching network 112, 122, a processor 114, 124 and a memory 116, 126. The processor 114, 124 operates according to connection requests received on incoming access lines or signalling transmission facilities 144 and according to instructions and routing tables stored in the memory 116, 126 to control the switching network 112, 122 so as to route calls through the PSTN 100. The memory 116 of the originating switch 110 contains instructions which support interworking between PRA and Integrated Services User Part (ISUP) protocols. The memory 126 of the terminating switches 126 contains instructions which support ISUP connectivity and suppressed ringing access to subscriber lines 22 connected to the terminating switches 120. The CCS network 140 interconnecting the switches 110, 120 also supports the ISUP protocol.

Figure 2:
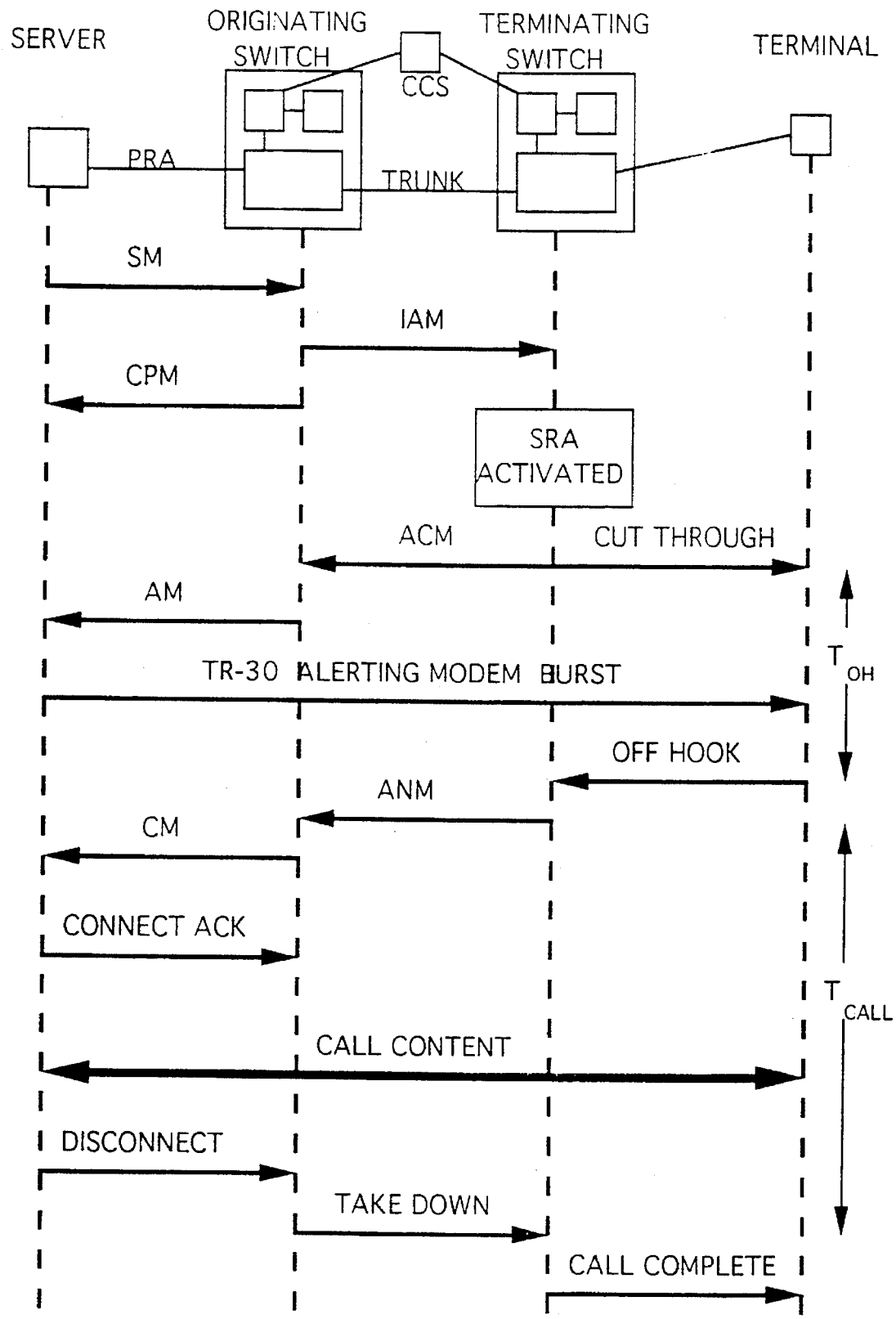
FIG. 2 is a signal flow diagram illustrating a signal flow sequence for establishing a suppressed ringing connection according to an embodiment of the invention.

FIG. 2 is a signal flow diagram illustrating a signal flow sequence for establishing a suppressed ringing connection between the server 10 and a subscriber line 22. The server 10 initiates the connection by sending a connection request in the form of a Setup Message (SM) to the originating switch 110 to which it is connected via the PRA line 12. The SM has a routing number in a Called Party Number (CdPN) field and a number corresponding to the subscriber line 22 to which suppressed ringing access is desired in an Original Called Number (OCN) field. At least one unique called party number must be defined for each terminating switch 120 providing the suppressed ringing access service.

The processor 114 of the originating switch 110 receives the SM on the PRA line 12, and processes the received SM according to instructions stored in its memory 116, adding a server identification number (determined from the PRA access line on which the SM was received) to a Calling Party Number (CgPN) field, a Screening Indicator (SI) and a Signalling Protocol Indicator (SPI) to the information already stored in the CdPN and OCN fields of the SM to generate an Initial Address Message (IAM) from the SM. The processor 114 of the originating switch 110 consults routing tables stored in the memory 116 to select a suitable trunk 130 based on the routing number in the CdPN field, controls the network 112 to couple the PRA line 12 to the selected trunk 130, and sends the connection request, now in the form of the IAM, to the appropriate terminating switch 120 via the CCS network 140. The processor 114 of the originating switch 110 also sends a Call Proceeding Message (CPM) to the server 10 via the PRA line 12.

If the CCS network 140 does not support ISUP protocol between the originating switch 110 and the terminating switch 120, the STP 142 modifies the Signalling Protocol Indicator (SPI) of the IAM accordingly before forwarding the IAM to the terminating switch 120.

Figure 3A:
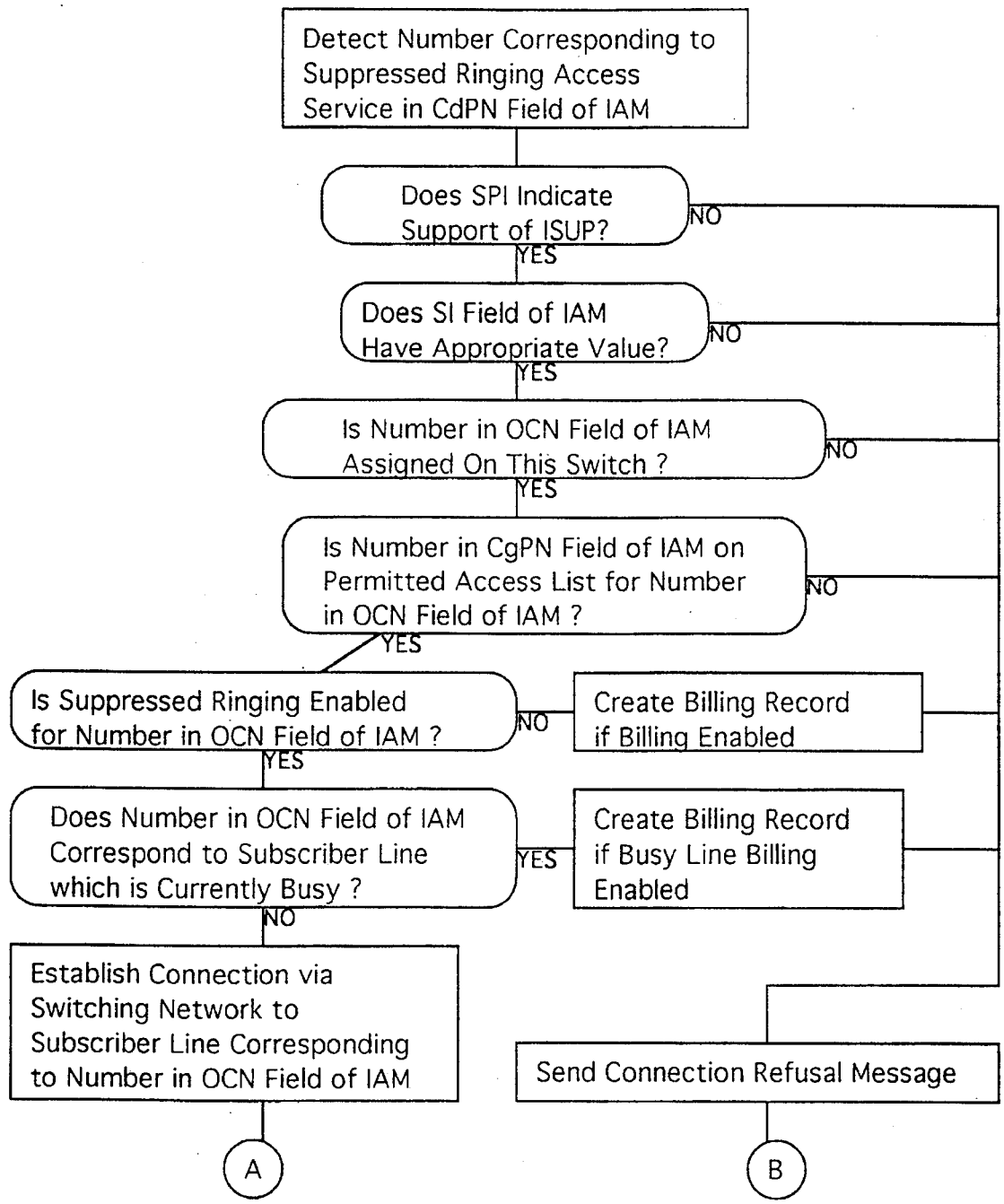
FIGS. 3a and 3b are a flow chart illustrating logical operations performed at a terminating switch of the telecommunications network of FIG. 1 to provide suppressed ringing access according to an embodiment of the invention.
Figure 3B:
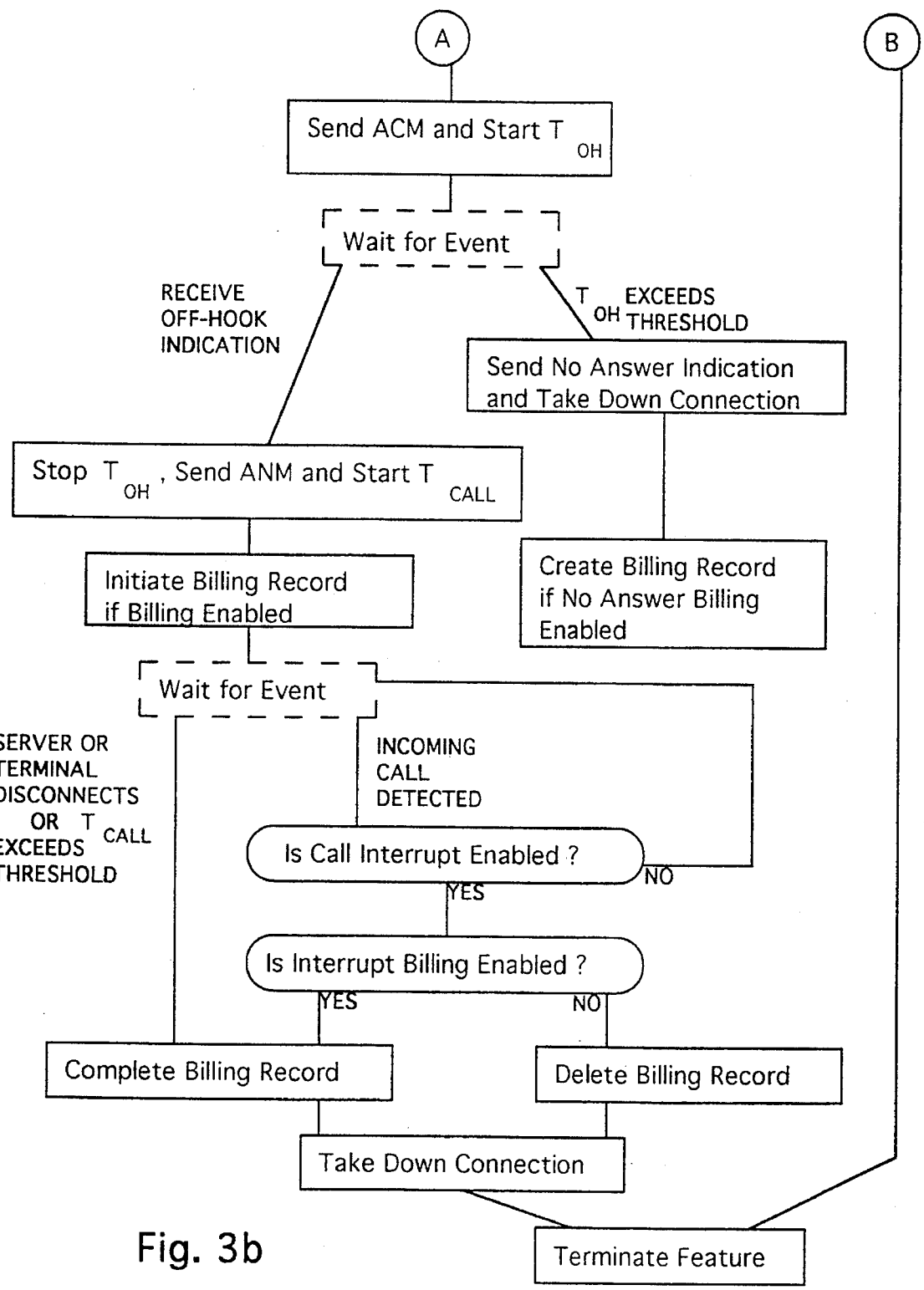

The processor 124 of the terminating switch 120 receives the IAM on an incoming signalling transmission facility 144, and processes the received IAM according to instructions stored in its memory 126. FIG. 3 is a flow chart which illustrates logical operations performed at the terminating switch 120 to provide suppressed ringing access to the desired subscriber line 22.

The processor 124 of the terminating switch 120 first determines from the routing number in the CdPN field of the IAM that suppressed ringing access is desired and activates the suppressed ringing access feature by accessing an appropriate set of instructions stored in the memory 126. The processor 124 checks the signalling protocol indicator (SPI) of the IAM to verify that the CCS network 140 supports ISUP protocol between the originating switch 110 and the terminating switch. If the SPI indicates the COS network 140 does not support ISUP between the originating switch 110 and the terminating switch 120, the IAM message will not contain sufficient information to support suppressed ringing access, so the processor 124 sends a message back to the server 10 via the CCS network 140, the originating switch 110 and the PRA line 12 indicating that the connection cannot be completed.

The processor 124 then checks the SI field of the IAM to ensure that the screening indicator has an appropriate value assigned by the originating switch 110. If the screening indicator does not have an appropriate value, the processor 124 considers the connection request to be unauthorized, and sends a message back to the server 10 via the CCS network 140, the originating switch 110 and the PRA line 12 indicating that the connection cannot be completed.

The processor 124 then checks the server number in the CgPN field of the IAM against a list stored in the memory 126 of servers permitted to access the subscriber line 22 corresponding to the number in the OCN field of the IAM to ensure that the server 10 is authorized to access that subscriber line 22. If the server 10 is not authorized to access that subscriber line 22, the processor 124 sends a message back to the server 10 via the CCS network 140, the originating switch 110 and the PRA line 12 indicating that the connection cannot be completed.

The processor 124 then checks records stored in the memory 126 to verify that the subscriber line number in the OCN field of the IAM is assigned on the terminating switch 120. If the requested subscriber line number is not assigned on the terminating switch 120, the connection cannot be completed, and the processor 124 sends a message back to the server 10 via the CCS network 140, the originating switch 110 and the PRA line 12 indicating that the connection cannot be completed.

The processor 124 then checks records stored in the memory 126 corresponding to the subscriber line number in the OCN field of the IAM to verify that the suppressed ringing feature is enabled for the requested subscriber line 22. If the suppressed ringing feature is not enabled for the requested subscriber line 22, the processor 124 sends a message back to the server 10 via the CCS network 140, the originating switch 110 and the PRA line 12 indicating that the connection cannot be completed.

The processor 124 then checks a status indicator stored in the memory 126 for the requested subscriber line number. If the requested subscriber line is busy, the processor 124 sends a message back to the server 10 via the CCS network 140, the originating switch 110 and the PRA line 12 indicating that the connection cannot be completed. The processor 124 also creates a suitable billing record if busy billing is enabled on the terminating switch 120.

If none of the above conditions indicate that a connection cannot or should not be completed, the processor 124 causes the switch network 122 to connect the selected trunk 130 to the requested subscriber line 22 without application of a ringing signal to be applied to the subscriber line 22.

The processor 124 also sends an Address Complete Message (ACM) back to the originating switch 110 via the selected trunk 130, and the originating switch 110 sends an Alerting Message (AM) back to the server 10 via the PRA line 12 to alert the server 10 that the connection has been established. The processor 124 also starts a timer $T_{OH}$ when the ACM is sent.

The server 10 sends a TR-30 alerting modem burst over the established connection to the terminal 20 to request that the terminal 20 go off-hook. The terminal 20 sends an off-hook indication to the processor 124 via the subscriber line 22, the processor 124 sends an ANswer Message (ANM) to the originating switch 110 via the selected trunk 130, and the originating switch 110 sends a Connect Message (CM) to the server 10 via the PRA line 12 to alert the server 10 that the terminal 20 is now off-hook and ready to communicate with the server 10. The processor 124 also starts a $T_{CALL}$ timer when it sends the ANM to the originating switch 110 and opens a billing record if billing is enabled for the suppressed ringing access service. The server 10 sends a connect acknowledgement to the originating switch 110 via the PRA line 12 when it receives the CM.

(If the $T_{OH}$ timer exceeds a preset threshold (e.g. 20 seconds) before the off-hook indication is received by the processor 124, the processor 124 sends a release message to the server 10 via the selected trunk 130, the originating switch 110 and the PRA line 12, and the terminating switch 120 and originating switch 110 take down the connection. If billing is enabled at the terminating switch 120, the processor 124 creates a suitable billing record.)

Once the connection is established and the server 10 is alerted that the terminal 20 is off-hook, information suitable to the particular service implemented by the server 10 is transmitted between the server 10 and the terminal 20. In the case of a telemetry service, the information flow is primarily from the terminal 20 (e.g. a utility meter interface) to the server 10. However, in the case of a server 10 implementing an advertising or information service, the information flow may be primarily from the server 10 to the terminal 20 (e.g. an Analog Display Services Interface (ADSI) telephone. Alternatively, the server 10 may download data or instructions (e.g. softkey definitions) to the terminal 20 to enable the terminal 20 for access to new information or telecommunications services. Once the connection between the server 10 and the terminal 20 is made, the transfer of information between the server 10 and the terminal 20 occurs without any involvement of the processors 114, 124 of the originating and terminating switches 110, 120.

When the server 10 has completed its interaction with the terminal 20, it sends a disconnect message to the originating switch 110 via the PRA line 12. The originating switch 110 sends appropriate messages to the terminating switch 120 via the CCS network 140 so that the connection is taken down, and the terminating switch 120 sends an on-hook indication to the terminal 20 which goes back on hook. The terminating switch 120 also turns off the $T_{CALL}$ timer and completes a suitable billing record.

Disconnect can also be initiated by the terminal 20. For example, if a user attempts to make an outgoing call on the terminal 20, the terminal 20 may initiate disconnection of the server-initiated call to free the subscriber line 22 for the outgoing call. In that case, the disconnect message is sent from the terminal 20 to the terminating switch 120 via the subscriber line 22, and the terminating switch 120 sends appropriate messages to the originating switch via the CCS network 140 so that the connection is taken down. The originating switch 110 sends an indication to the server 10 via the PRA line 12 to indicate that the terminal 20 has disconnected. The terminating switch 120 also turns off the $T_{CALL}$ timer and creates a suitable billing record.

The terminating switch 120 can also be programmed to interrupt server-initiated calls if other incoming calls requesting the same subscriber line 22 are detected. When the terminating switch 120 receives an IAM containing a subscriber line number of a subscriber line presently engaged in a suppressed ringing access call, the terminating switch 120 takes down the current connection and sends appropriate messages to the originating switch 110 via the CCS network 140 to take down the connection at the originating switch 110. The terminating switch 120 starts a timer when it takes down the connection and waits for an on-hook indication from the terminal 20 connected to the subscriber line 22. If an on-hook indication is received from the terminal within approximately 2 seconds, the terminating switch 120 completes the incoming call. However, if no on-hook indication is received before approximately 2 seconds expire, the terminating switch 120 sends a busy indication via the CCS network 140 so that the incoming call is not completed. The terminating switch 120 may be programmed to bill for interrupted server-initiated calls, or to not bill for such calls.

The terminating switch 120 can also be programmed to disconnect server-initiated calls when the $T_{CALL}$ timer exceeds a predetermined threshold (e.g. 225 seconds) corresponding to a maximum length for server-initiated calls.

If the server 10 requests suppressed ringing access to a subscriber line 22 provisioned on the same switch 110 as the server 10, that switch 110 performs most of the functions of both the originating and terminating switches 110, 120 as described above, and the signal flows required to set up the requested connection are simplified accordingly. In particular, the switch 110 receives the SM on the PRA line 12, sends the CPM back to the server via the PRA line 12 and executes the suppressed ringing access instructions on its own processor 114 to establish the connection to the subscriber line 22 via its own network 112, starts the $T_{OH}$ timer and sends the AM to the server 10 via the PRA line 12. The switch 110 stops the $T_{OH}$ timer, starts the $T_{CALL}$ timer and initiates a billing record when it receives an off-hook indication on the subscriber line 22, and sends the CM to the server 10 on the PRA line 12. Upon receiving a disconnect message from either the server 10 or the terminal 20, it takes down the connection, turns off the $T_{CALL}$ timer and completes the billing record.

Some subscriber lines 22 are connected to their terminating switches 120 via Subscriber Line Carrier (SLC) facilities 24 which require an Open Switch Interval (OSI) signal to complete a connection between the terminating switch 120 and the subscriber line 22. Each terminating switch 120 serving subscriber lines 22 via such SLC facilities is assigned a second unique routing number which identifies that suppressed ringing access with OSI is required. The server 10 establishes a connection to a subscriber line 22 served via SLC 24 facilities requiring OSI by initiating a SM having the second unique routing number for the appropriate terminating switch 120 in the CgPN field. The second unique routing number is passed to the terminating switch in the CgPN field of the IAM. The terminating switch 120 recognizes that suppressed ringing access with OSI is required by the presence of the second unique routing number in the CgPN field of the IAM, and performs a connection routine essentially as described above, except that an OSI signal is provided to establish the connection via the SLC facilities.

Some subscriber lines 22 may be connected to their terminating switches 120 via Subscriber Line Carrier (SLC) facilities 24 which require a ringing signal to complete a connection between the terminating switch 120 and the subscriber line 22. Each terminating switch 120 serving subscriber lines 22 via such SLC facilities may be assigned another unique routing number which identifies that suppressed ringing access with an abbreviated ringing signal is required. The server 10 establishes a connection to a subscriber line 22 served via SLC 24 facilities requiring abbreviated ringing by initiating a SM having this unique routing number for the appropriate terminating switch 120 in the CgPN field. The unique routing number is passed to the terminating switch in the CgPN field of the IAM. The terminating switch 120 recognizes that suppressed ringing access with abbreviated ringing is required by the presence of the unique routing number in the CgPN field of the IAM, and performs a connection routine essentially as described above, except that a short burst of ringing is applied to the SLC facilities 24 to establish the connection between the terminating switch 120 and the subscriber line 22 via the SLC facilities 24. The duration of the ringing signal is made long enough to establish the connection through the SLC facilities 24, but short enough to prevent audible ringing of any telephone set 20 connected to the subscriber line 22.

The connection between the originating switch 110 and the terminating switch 120 may include one or more other switches and trunks connected in tandem. Routing of the connection is accomplished, as far as possible, using the CCS network 140 for transfer of signalling information. If one or more of the other switches do not support ISUP protocol, the such other switches modify the signalling protocol indicator in the IAM accordingly, and the terminating switch responds to the modified signalling protocol indicator by refusing to complete the suppressed ringing access connection as described above.

If desired, the server 10 can establish a ringing connection to a subscriber line 22 via the PSTN 100 in the normal manner. In particular, the server 10 can send a SM having the number of the desired subscriber line 22 in the CdPN field. The originating and terminating switches 110, 20 will handle the call in the normal manner without. activating the suppressed ringing feature. The terminals 20 can also establish normal ringing connections to the server 10 via the PSTN in the normal manner.

The embodiments described above may be modified without departing from the principles of the invention.

For example, servers 10 can be categorized in customer or business groups, and screening for provision of suppressed ringing access service can be based on the customer or business group to which the requesting server belongs. In this case, the originating switch 110 may insert a business group identifier in a BGid field of the IAM, the business group identifier being determined according to the particular PRA line on which the incoming call is received. The terminating switch 120 may then screen on the basis of the business group identifier in the BGid field of the IAM, or may convert the business group identifier to a customer group identifier and screen on the basis of the customer group identifier.

More sophisticated screening capabilities may be provided using off-board processors connected to the terminating switches 120. Such off-board processors may access databases to determine which servers 10 may have suppressed ringing access to which subscriber lines so that an individual subscriber may specify that some servers 10 may have access to his subscriber line 22 while others do not.

The PRA line 12 could be replaced by any other ISDN access line which supports an ISDN protocol supporting identification of the server 10, for example a Basic Rate Access (BRA) line.

The subscriber line number could be inserted in fields of the SM and IAM other than the OCN field, and the originating and terminating switches could be programmed accordingly to locate the subscriber line number in such fields as required to implement the method described above.

These and other modifications are within the scope of the invention as claimed below.

We claim:

1. A method for providing a connection between a server and a subscriber line without ringing a telephone connected to the subscriber line, the method comprising:

sending a connection request from the server to an originating switch, the connection request comprising a signal indicating the subscriber line to which the server is to be connected and a signal indicating that a suppressed ringing connection to that subscriber line is desired;

processing the connection request at the originating switch and forwarding the processed connection request to a terminating switch which is connected to the subscriber line; and performing a connection routine at the terminating switch in response to the forwarded connection request to connect the server to the subscriber line, the connection routine being adapted to avoid audible ringing of a telephone set connected to the subscriber line.

2. A method as defined in claim 1, wherein:

the server sends the connection request to the originating switch via an access facility using an ISDN access protocol, the originating switch translates the connection request from the ISDN access protocol to an Integrated Services User Part (ISUP) protocol and forwards the translated connection request to the terminating switch; and the terminating switch responds to the translated connection request to perform the connection routine thereby connecting the server to the subscriber line via the originating switch and Public Switched Telephone Network (PSTN) facilities linking the originating switch to the terminating switch.

3. A method as defined in claim 2, wherein the connection request comprises a routing number and a subscriber line number.

4. A method as defined in claim 3, wherein the connection request comprises:

a Setup Message (SM) sent from the server to the originating switch, the SM comprising a routing number and a subscriber line number; and an Initial Address Message (IAM) sent from the originating switch to the terminating switch, the IAM comprising the routing number, the number corresponding to the subscriber line, and a server identification number.

5. A method as defined in claim 4 wherein the originating switch routes the connection request to the terminating switch based on the routing number.

6. A method as defined in claim 4, wherein the terminating switch is responsive to the subscriber line number to connect the server to the subscriber line and is responsive to the routing number to suppress ringing on the subscriber line.

7. A method as defined in claim 6, wherein the terminating switch is responsive to the routing number to select one suppressed ringing access treatment from a plurality of alternative suppressed ringing access treatments for application to the subscriber line.

8. A method as defined in claim 4, wherein:

the originating switch adds the server identification number to generate the IAM from the SM; and the terminating switch completes the connection to the subscriber line only if the server identification number is on a screening list.

9. A method as defined in claim 8, wherein the server identification number is common to a plurality of servers in an identified group of servers.

10. A method as defined in claim 4, wherein:

the originating switch sets a screening indicator in the IAM; and the terminating switch completes the connection to the subscriber line only if the screening indicator has an appropriate value.

11. A method as defined in claim 1, wherein performance of the connection routine comprises application of no ringing signal to the subscriber line.

12. A method as defined in claim 11, wherein performance of the connection routine comprises application of an Open Switch Interval(OSI) signal to subscriber line carrier equipment connected to the desired subscriber line to cause the subscriber line carrier equipment to complete a connection.

13. A method as defined in claim 1, wherein the performance of the connection routine comprises application of a ringing signal to subscriber line carrier equipment connected to the desired subscriber line, said ringing signal having a duration sufficient to cause the subscriber line carrier equipment to complete a connection but insufficient to cause audible ringing of a telephone set connected to the subscriber line.

14. A method as defined in claim 1, further comprising downloading information from the server to a telecommunications terminal connected to the subscriber line.

15. A method as defined in claim 14, wherein the telecommunications terminal comprises a display, the method further comprising displaying at least some of the downloaded information on the display.

16. A system for providing a connection between a server and a subscriber line without ringin a telephone connected to the subscriber line, comprising:

connection request generation means resident in the server for generating a connection request comprising a signal indicating a subscriber line to which the server is to be connected and a signal indicating that a suppressed ringing connection to that subscriber line is desired;

a terminating switch on which the desired subscriber line is provisioned, an originating switch;

an access line connecting the server to the originating switch; and trunking and signalling facilities connecting the originating switch to the terminating switch the originating switch being responsive to the connection request to process the connection request and to forward the processed connection request to the terminating switch via the signalling facilities; and the terminating switch being responsive to the forwarded connection request to connect the server to the subscriber line via the originating switch and the trunking facilities while suppressing application of ringing to the subscriber line so as to avoid audible ringing of a telephone set connected to the subscriber line.

17. A system as defined in claim 16, wherein:

the connection request generation means is operable to generate a connection request comprising a routing number and a subscriber line number;

the originating switch is operable to add a server identification number to the connection request and is operable to route the connection to the terminating switch based on the routing number in the connection request; and the terminating switch is responsive to the routing number in the connection request to provide suppressed ringing access to the subscriber line specified in the connection request only if the server identification number in the connection request is on a screening list stored at the terminating switch.

* * * * *